(12) United States Patent
Endo

(10) Patent No.: US 8,649,615 B2
(45) Date of Patent: Feb. 11, 2014

(54) MOVING PICTURE COMPRESSION CODING APPARATUS

(75) Inventor: Hiroaki Endo, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 12/140,038

(22) Filed: Jun. 16, 2008

(65) Prior Publication Data

US 2008/0310739 A1 Dec. 18, 2008

(30) Foreign Application Priority Data

Jun. 18, 2007 (JP) ................................. 2007-160379
May 2, 2008 (JP) ................................. 2008-120407

(51) Int. Cl.
*G06K 9/36* (2006.01)
*G06K 9/46* (2006.01)

(52) U.S. Cl.
USPC ............................ 382/232; 382/236; 375/240

(58) Field of Classification Search
None
See application file for complete search history.

(56) References Cited

U.S. PATENT DOCUMENTS 5,130,797 A * 7/1992 Murakami et al. ....... 375/240.16
5,703,648 A * 12/1997 Shikakura ................. 375/240.03
2003/0099292 A1 * 5/2003 Wang et al. ............... 375/240.12
2004/0218673 A1 * 11/2004 Wang et al. ............... 375/240.12
2004/0257472 A1 * 12/2004 Mpr et al. ..................... 348/565
2005/0123207 A1 * 6/2005 Marpe et al. .................. 382/239
2007/0092006 A1 * 4/2007 Malayath ................. 375/240.16

FOREIGN PATENT DOCUMENTS

| EP | 1553782 A2 * | 7/2005 |
|---|---|---|
| JP | 7-095572 A | 4/1995 |
| JP | 08-251598 A | 9/1996 |
| JP | 09-294262 A | 11/1997 |
| JP | 2000-253397 A | 9/2000 |
| JP | 2006-295721 A | 10/2006 |
| JP | 2006-340183 A | 12/2006 |
| WO | 2005/125215 A1 | 12/2005 |

* cited by examiner

*Primary Examiner* — Jason M Repko
*Assistant Examiner* — Jhere Rowland
(74) *Attorney, Agent, or Firm* — Canon U.S.A., Inc. IP Division

(57) ABSTRACT

A moving picture compression coding apparatus divides a screen into at least three regions and performs compression coding for the at least three regions by encoding units. The moving picture compression coding apparatus includes a coding control unit configured to control the encoding units to encode the data for different regions in parallel and to control the encoding such that the data for an upper region out of two adjacent upper and lower regions in the vicinity of the center of the screen of the at least three regions is encoded prior to the encoding of the data for the lower region or such that the data for a left region of two adjacent left and right regions in the vicinity of the center of the screen of the at least three regions is encoded prior to the encoding of the data for the right region.

11 Claims, 6 Drawing Sheets

MOVING PICTURE COMPRESSION CODING APPARATUS

BACKGROUND OF THE INVENTION

1. Field of the Invention

The present invention relates to a compression coding apparatus for moving picture data, and in particular, to a technique suited for use in dividing a screen and encoding the moving picture data of the divided screen in parallel by use of a plurality of encoding units.

2. Description of the Related Art

Digital video cameras are well known as a moving picture recording apparatus that has an integrated camera and that obtains an image of a subject, performs compression coding on the obtained moving picture data, and records the moving image data. Instead of traditional magnetic tape, a randomly accessible highly convenient disk medium or semiconductor memory is becoming used in a recent digital video camera. However, in general, disk media have a small amount of memory capacity, so it is necessary to perform compression coding with a high degree of efficiency.

These days, with the expectations for high image quality, a digital video camera that deals with a high-definition (HD) image, which has a larger amount of information than that of a standard image, is being developed. Therefore, also from the viewpoint of an increased amount of information of an image in itself, compression coding with a high degree of efficiency is necessary. Currently, the moving picture experts group (MPEG) scheme is often used as a standard technique for compression coding. In the MPEG scheme, encoding with a high degree of efficiency is realized by motion compensation prediction using a plurality of screens constituting a moving picture. To do this, it is necessary to process enormous volumes of image data at high speed.

If an encoding circuit operates with significantly high speed to perform the above-described high-speed processing, a problem exists in which the load becomes heavy and power consumption is increased. One example of an image coding apparatus that aims to solve this problem is described in Japanese Patent Laid-Open No. 7-095572. This apparatus solves the above problem by dividing each screen in a motion image signal into a plurality of regions and encoding the image signal divided into the regions in parallel using a plurality of encoding units.

When each screen in a motion image signal is divided into a plurality of regions and the regions are subjected to encoding in parallel by a plurality of encoding units, as described above, image quality may vary in a boundary portion of adjacent regions. The image coding apparatus described in Japanese Patent Laid-Open No. 7-095572 divides an image signal into small regions in a second division direction different from the direction of the above division and controls an encoding parameter for use by each of the encoding units for each of the small regions formed in the second division direction. The image coding apparatus makes degradation in image quality in the boundary portion of the small regions less noticeable by encoding the small regions using the same encoding parameter.

However, the image coding apparatus described in Japanese Patent Laid-Open No. 7-095572 controls the encoding parameter for each of the small regions formed by dividing of the screen in two different directions. Therefore, a predetermined set value is undesirably determined as the encoding parameter for each of the regions, so it is difficult to use an encoding parameter suited for the characteristics of an image.

SUMMARY OF THE INVENTION

The present invention provides a technique for making degradation in image quality in a boundary portion of regions into which a screen is divided and encoded less noticeable using a simple structure and for providing the capability of setting an encoding parameter suited for the characteristics of an image.

According to an aspect of the present invention, a moving picture compression coding apparatus includes a region segmentation unit, a plurality of encoding units, an encoded-data combining unit, and a coding control unit. The region segmentation unit is configured to horizontally divide a screen constituting moving picture data into at least three regions. The plurality of encoding units are configured to encode the moving picture data for each of the regions to form encoded data elements, a number of the encoding units being smaller than a number of the regions. The encoded-data combining unit is configured to combine the encoded data elements. The coding control unit is configured to control the plurality of encoding units to encode the moving picture data for different regions in parallel and control the encoding such that the moving picture data for an upper region out of two adjacent upper and lower regions located in a vicinity of a center of the at least three regions is encoded prior to the encoding of the moving picture data for the lower region.

According to another aspect of the present invention, a moving picture compression coding apparatus includes a region segmentation unit, a plurality of encoding units, an encoded-data combining unit, and a coding control unit. The region segmentation unit is configured to vertically divide a screen constituting moving picture data into at least three regions. The plurality of encoding units are configured to encode the moving picture data for each of the regions to form encoded data elements, a number of the encoding units being smaller than a number of the regions. The encoded-data combining unit is configured to combine the encoded data elements. The coding control unit is configured to control the plurality of encoding units to encode the moving picture data for different regions in parallel and control the encoding such that the moving picture data for a left region out of two adjacent left and right regions located in a vicinity of a center of the screen of the at least three regions is encoded prior to the encoding of the moving picture data for the right region.

Further features of the present invention will become apparent from the following description of exemplary embodiments with reference to the attached drawings.

DESCRIPTION OF THE EMBODIMENTS

Numerous embodiments, features and aspects of the present invention will be described with reference to the drawings.

First Embodiment

Figure 1:
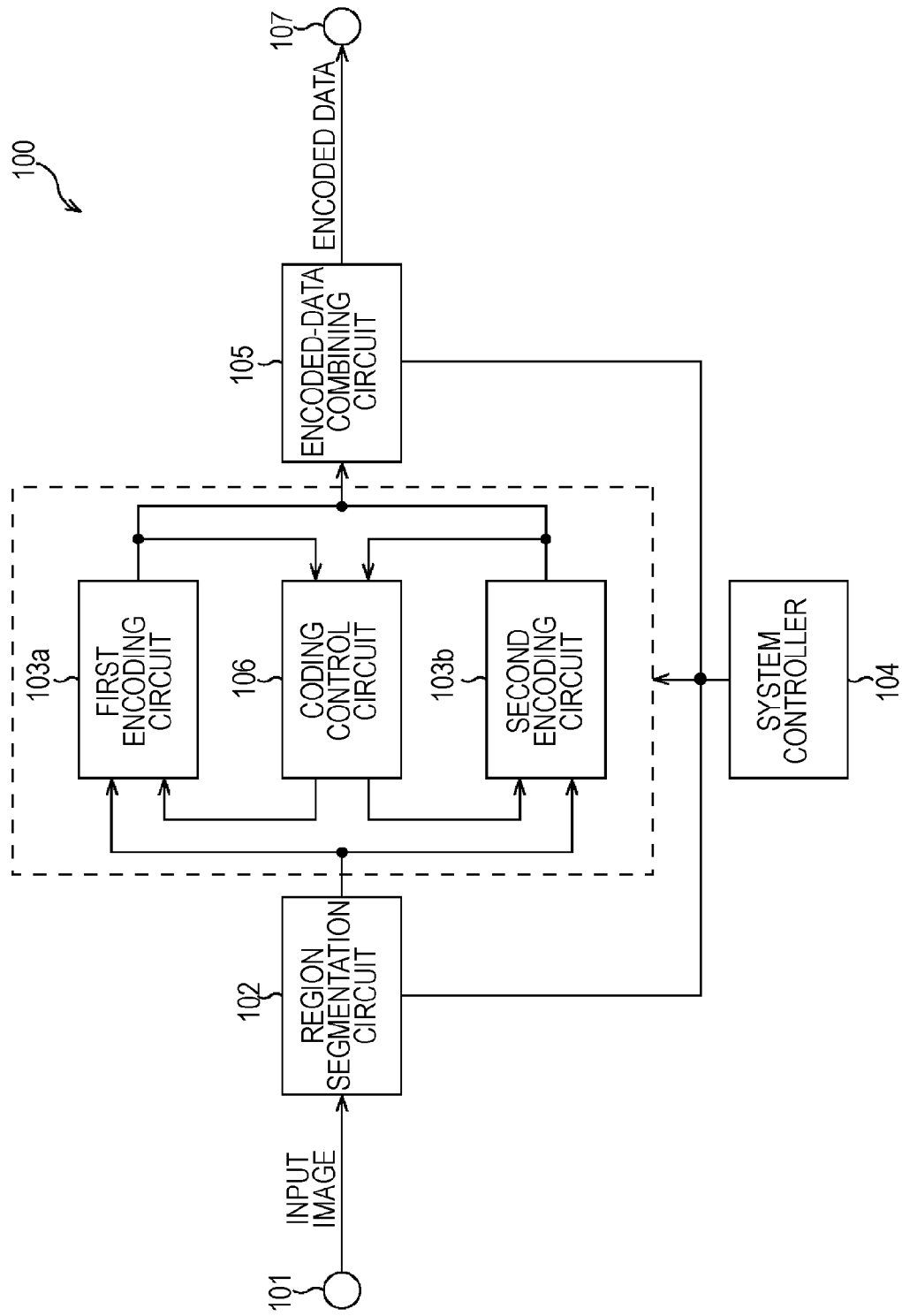
FIG. 1 is a block diagram that illustrates a structure of a moving picture coding apparatus according to a first embodiment of the present invention.

FIG. 1 is a block diagram that illustrates a structure of a moving picture coding apparatus according to a first embodiment of the present invention. The moving picture coding apparatus in the present embodiment performs compression coding on moving picture data using motion compensation prediction. The moving picture coding apparatus in the present embodiment is applicable to an image pickup device, such as a digital video camera.

In FIG. 1, the moving picture coding apparatus 100 includes an image signal input terminal 101 configured to receive moving picture data (image signal) input from, for example, an image pickup unit (not shown). The moving picture coding apparatus 100 also includes a region segmentation circuit 102 configured to divide a one-field or one-frame image signal in a moving picture into n regions, a first encoding circuit 103a, and a second encoding circuit 103b. The first and second encoding circuits 103a and 103b each perform encoding using motion compensation prediction that utilizes motion compensation of an image signal.

The moving picture coding apparatus 100 also includes an encoded-data combining circuit 105 configured to combine encoded data elements output from the first and second encoding circuits 103a and 103b. The moving picture coding apparatus 100 further includes a coding control circuit 106 configured to control an encoding parameter on the basis of a result of the encoding output from the first and second encoding circuits 103a and 103b. The moving picture coding apparatus 100 also includes an encoded-data output terminal 107 configured to output combined encoded data to a storage medium or a communication channel (not shown).

The first and second encoding circuits 103a and 103b operate in parallel by control of the coding control circuit 106. Operation of each of the above-described components is controlled by a system controller 104. An actual moving picture coding apparatus needs other components, but the description thereof is omitted here because they are not a main point of the present invention.

Figure 5:
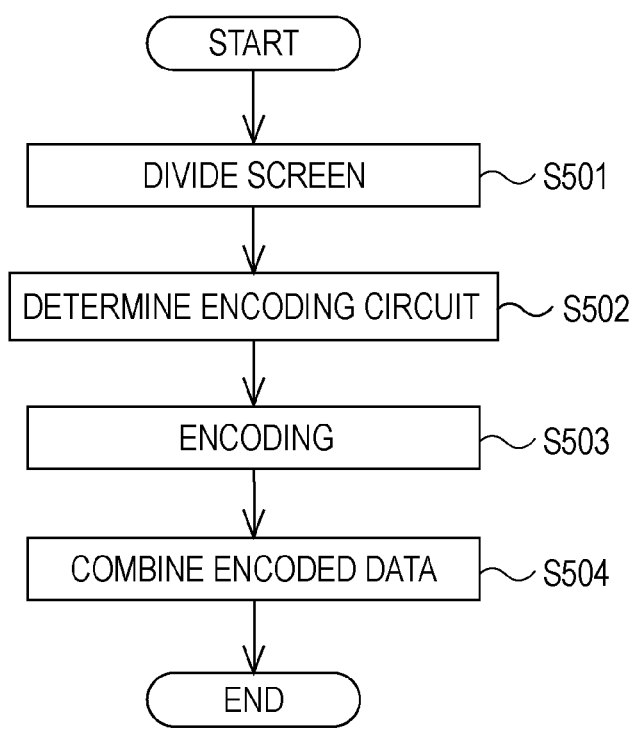
FIG. 5 illustrates an example operating procedure of the moving picture coding apparatus according to the embodiments of the present invention.

Operation of the moving picture coding apparatus 100 will now be described below. FIG. 5 is a flowchart that illustrates an example operating procedure of the moving picture coding apparatus according to the embodiments of the invention. When an image signal received in the image signal input terminal 101 in units of fields or frames is input into the region segmentation circuit 102, the process illustrated in the flowchart starts.

Figure 2:
FIG. 2 illustrates an example of how a screen is divided according to the first embodiment.

First, in step S501, the region segmentation circuit 102 divides each screen 200 included in an input image signal into four regions (a first area 201 (Area 1) to a fourth area 204 (Area 4)) in units of slices, as illustrated in FIG. 2. The slice is a unit of an encoding processing that the first and second encoding circuits 103a and 103b performs. FIG. 2 illustrates an example of how one screen is divided into four portions along predetermined pixel lines in a horizontal direction. In the present embodiment, the number of encoding circuits, m, is two, and the number of divisions, i.e., regions formed by dividing performed by the region segmentation circuit 102, n (n is an integer greater than two; n>2), is four.

In step S502, the coding control circuit 106 determines an encoding circuit that is to perform encoding for each of the first area 201 to the fourth area 204 out of the plurality of encoding circuits and a temporal encoding order.

In step S503, the first and second encoding circuits 103a and 103b perform encoding for their respective assigned regions. At this time, the coding control circuit 106 controls the first and second encoding circuits 103a and 103b to perform their respective encoding processes in parallel. Then, in step S504, the encoded-data combining circuit 105 combines encoded data elements formed by encoding performed by the first and second encoding circuits 103a and 103b and outputs the combined encoded data to the encoded-data output terminal 107, and the processing is completed.

Figure 3:
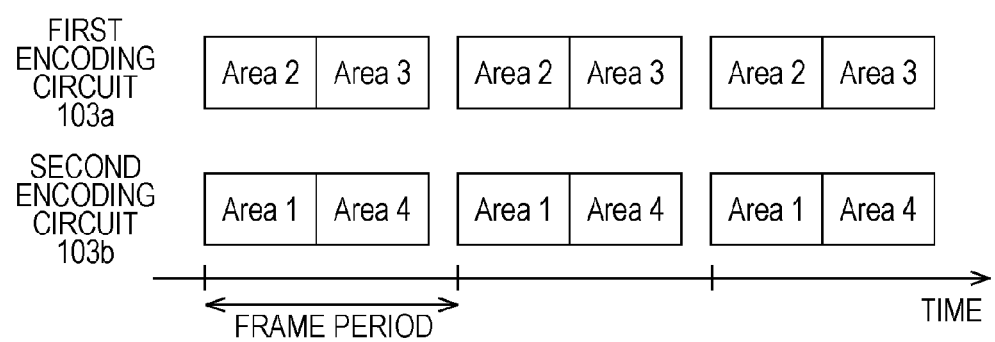
FIG. 3 illustrates an example encoding order according to the first embodiment.

In the present embodiment, the coding control circuit 106 makes an encoding process of slices included in one frame complete for one frame period of an input image signal. That is, the coding control circuit 106 controls the first and second encoding circuits 103a and 103b to encode image data elements for two regions out of the four regions at a time in parallel and controls each of the first and second encoding circuits 103a and 103b to encode the image data elements for the two regions in one frame. Each of the first and second encoding circuits 103a and 103b performs the encoding in a time division manner such that one frame is separated into the first and second halves, as illustrated in FIG. 3. That is, the image data elements for a plurality of regions out of the first area 201 to the fourth area 204 are encoded in parallel prior to the encoding for the remaining regions.

In the first half of a frame period, the coding control circuit 106 controls the first encoding circuit 103a to encode the data for the second area 202 (Area 2) and the second encoding circuit 103b to encode the data for the first area 201 (Area 1) in parallel therewith. In the second half of the frame period, the coding control circuit 106 controls the first encoding circuit 103a to encode the data for the third area 203 (Area 3), which is adjacent to the second area 202, and the second encoding circuit 103b to encode the data for the fourth area 204 (Area 4) in parallel therewith. When the portions located in the vicinity of the center of the screen are noted, the data for the upper region (Area 2) is encoded prior to the encoding of the data for the lower region (Area 3).

In encoding control, the coding control circuit 106 sets an initial value of a quantization step size being an encoding parameter for each of the encoding circuits. The encoding for each area is performed in sequence from above in units of predetermined pixel blocks (e.g., macroblocks). Therefore, in the present embodiment, to determine the initial value of the quantization step size in the third area 203, the quantization step size for the last block in the second area 202 is referred to from a result of encoding for the second area 202. Specifically, the coding control circuit 106 holds the quantization step size for the last block in the second area 202, and sets the quantization step size for the last block in the second area 202 as the initial value of the quantization step size for a block to be first encoded in the third area 203. Such encoding control enables the continuity between the quantization step size in the second area 202 located in the vicinity of the center of the screen and that in the third area 203, which is adjacent to the second area 202, to be ensured. Accordingly, the continuity of image quality in the vicinity of the center of the screen, where differences in image quality are prone to being visually recognized, can be ensured.

The first area 201 and the fourth area 204, which are not located in the vicinity of the center of the screen, are remote from each other. Therefore, the optimal quantization step size suited for the characteristics of an image can be set through encoding control for each area on the basis of the details of a block to be encoded.

As described above, in the present embodiment, the encoding order and the encoding parameters are determined such that the continuity of image quality between areas located in the vicinity of the center of the screen is ensured. As a result, the number n of divisions (regions formed by a dividing process) is set at a value larger than the number m of encoding circuits. If the number n of divisions is set at a high number, the difference in image quality in boundary portions of regions that are not located in the vicinity of the center of the screen may be significantly large. To avoid this, the number n of divisions is better set at a value not exceeding twice the number m of encoding circuits. That is, one encoding circuit does not perform encoding for three or more areas.

Operation of the first and second encoding circuits 103a and 103b will now be described below. Each of the first and second encoding circuits 103a and 103b considers a region formed by a dividing process (slice) as one unit in an encoding process and performs encoding for each region (slice).

Figure 4:
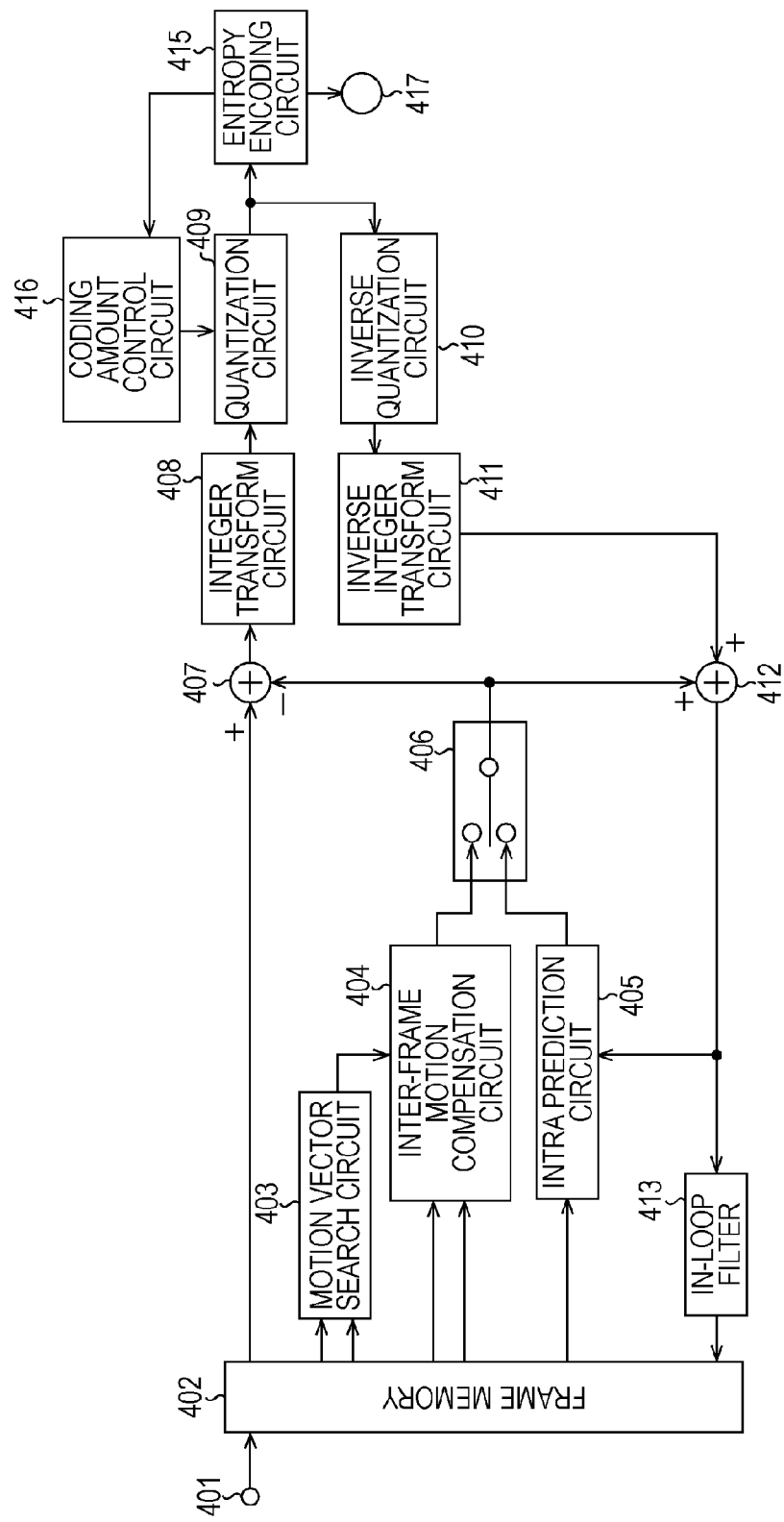
FIG. 4 is a block diagram that illustrates a detailed structure of a first encoding circuit according to embodiments of the present invention.

FIG. 4 is a block diagram that illustrates a detailed structure of the first encoding circuit 103a according to the embodiments of the present invention. The structure of the second encoding circuit 103b is substantially the same as that of the first encoding circuit 103a, so the description is omitted here.

In FIG. 4, the first encoding circuit 103a includes an input terminal 401 configured to receive an image signal, a frame memory 402, a motion vector search circuit 403, an interframe motion compensation circuit 404, an intra prediction circuit 405, and a switch 406. The first encoding circuit 103a also includes a subtractor 407, an integer transform circuit 408, a quantization circuit 409, an inverse quantization circuit 410, an inverse integer transform circuit 411, an adder 412, and an in-loop filter 413. The first encoding circuit 103a further includes an entropy encoding circuit 415, a coding amount control circuit 416, and an output terminal 417 through which encoded data is output. Operation of each of these components, including the coding amount control circuit 416, is controlled by the system controller 104.

An image signal input into the input terminal 401 is stored in the frame memory 402 in the order of a first frame, a second frame, a third frame, . . . in the case of a frame unit. The image signal is extracted from the frame memory 402 in the order of, for example, the third frame, the first frame, the second frame, . . . , i.e., the order in which encoding is to be performed.

Examples of an encoding system are "intra encoding" which uses only intra-frame image data (in the case of slice, only intra-slice image data) and "inter encoding" which also employs inter-frame prediction. Pictures (frames) subjected to the inter encoding are P pictures in which prediction is made to one reference frame in units of motion compensation (MC blocks) and B pictures in which prediction is made to up to two reference frames. Pictures subjected to the intra prediction are called I pictures. The reason why the order in which frames are subjected to encoding differs from the order in which the frames are input is to make prediction of a future frame in terms of time (backward prediction) possible.

When the intra encoding is performed, an image block to be encoded is read from the frame memory 402 and input into the intra prediction circuit 405. The intra prediction circuit 405 conducts block matching of a block to be encoded (image to be encoded) against a plurality of predicted images composed of local decoded images (described later) located in the vicinity of the block to be encoded within the same frame. An intra-predicted image that has the highest correlation is selected and output to the switch 406.

In the present embodiment, as previously described, the data elements for the two adjacent regions located above and below the central position of the screen (the second area 202 and the third area 203) are encoded by the same encoding circuit. That encoding circuit performs encoding for the third area 203 (the region below the center) after performing encoding for the second area 202 (the region above the center). In addition, when the third area 203 is encoded, the frame memory 402 holds at least data of a local decoded image for the lowermost block in the encoded second area 202. A local decoded image for the lowermost block in the encoded second area 202 is used in intra prediction performed on the topmost block in the third area 203. Information about, for example, the direction of the intra prediction on the lowermost block in the encoded second area 202 may be referred to in the intra prediction of the topmost block in the third area 203. Such information about a block for use in the intra prediction or information about the direction of the prediction can also be set in encoding as one of the encoding parameters.

When the intra encoding is performed, the switch 406 is switched to a side that handles an intra-predicted image, and the intra-predicted image is output to the subtractor 407. The subtractor 407 extracts differential information between the pixel value of the image to be encoded output from the frame memory 402 and that of the intra-predicted image received from the switch 406 and outputs the differential information to the integer transform circuit 408.

The integer transform circuit 408 performs integer transform (frequency conversion) on the differential information in the pixel value and transmits a conversion coefficient to the quantization circuit 409. Then, the quantization circuit 409 quantizes the input conversion coefficient. The entropy encoding circuit 415 performs entropy coding on the conversion coefficient quantized by the quantization circuit 409 and then outputs it to the encoded-data combining circuit 105 via the output terminal 417.

The quantization step size for use by the quantization circuit 409 is calculated by the coding amount control circuit 416 from feedback about the amount of encoding occurring in the entropy encoding circuit 415. The initial value of the quantization step size is set by the coding control circuit 106.

The inverse quantization circuit 410 inversely quantizes the conversion coefficient quantized by the quantization circuit 409, and the inversely quantized one is subjected to inverse integer transform performed by the inverse integer transform circuit 411. The adder 412 adds the intra-predicted image output from the switch 406 and differential information in pixel value subjected to the inverse integer transform performed by the inverse integer transform circuit 411 together to generate a local decoded image. The local decoded image is input into the intra prediction circuit 405 and used in generation of an intra-predicted image. After the local decoded image is subjected to a process for reducing coding artifacts performed by the in-loop filter 413, the local decoded image is stored in the frame memory 402 as a reference image for use in the inter encoding, which will be described below.

In contrast, when the inter encoding is performed, an image block to be encoded is read from the frame memory 402 and input into the motion vector search circuit 403. The motion vector search circuit 403 reads the above-described reference image from the frame memory 402 and detects a motion vector from the image to be encoded and the reference image. The inter-frame motion compensation circuit 404 performs motion compensation according to the motion vector detected by the motion vector search circuit 403 and generates the inter-predicted image.

When the inter encoding is performed, the switch 406 is switched to a side that handles an inter-predicted image, and the inter-predicted image is output to the subtractor 407. The subtractor 407 extracts a differential image between the image to be encoded and the inter-predicted image and outputs the extracted differential image to the integer transform circuit 408. The other processing is substantially the same as that in the intra encoding described above, so the description is not repeated here.

As described above, in the present embodiment, the first and second encoding circuits 103a and 103b perform their encoding processes in parallel, and the encoding for the second area 202 located in the vicinity of the center of the screen is performed prior to the encoding for the third area 203. The encoding order and encoding parameters are determined such that the continuity of image quality between areas located in the vicinity of the center of the screen is ensured. This enables information about a result of encoding to be shared and the continuity of image quality in the vicinity of the center of the screen, where differences in image quality are prone to being visually recognized, to be ensured, without having to significantly increase the operation speed of each of the encoding circuits. Accordingly, degradation in image quality can be made less noticeable, and the optimal encoding parameters suited for the characteristics of an image can be set.

Second Embodiment

Figure 6:
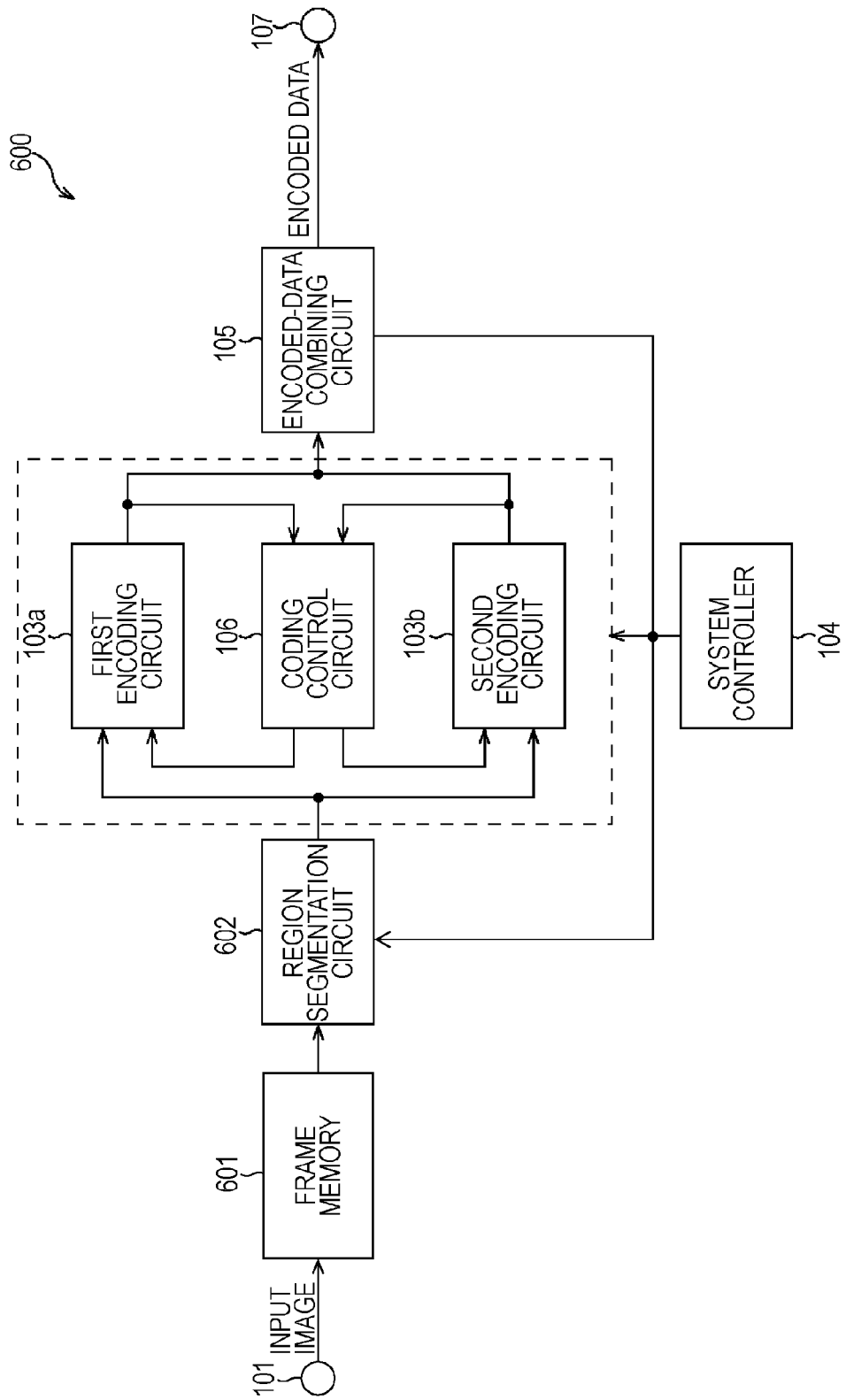
FIG. 6 is a block diagram that illustrates a structure of the moving picture coding apparatus according to a second embodiment of the present invention.

FIG. 6 is a block diagram that illustrates a structure of the moving picture coding apparatus according to a second embodiment of the present invention. The moving picture coding apparatus in the present embodiment performs compression coding on moving picture data using motion compensation prediction, as in the case of the first embodiment. The moving picture coding apparatus in the present embodiment is also applicable to an image pickup device, such as a digital video camera.

In FIG. 6, the moving picture coding apparatus 600 includes a region segmentation circuit 602, in place of the region segmentation circuit 102 included in the moving picture coding apparatus 100 illustrated in FIG. 1, and further includes a frame memory 601. Of the components illustrated in FIG. 6, the components having the same reference numerals as those of the components illustrated in FIG. 1 are substantially the same as in FIG. 1, so the description thereof is omitted here.

Operation of the moving picture coding apparatus 600 will now be described below with reference to the flowchart of FIG. 5 previously described.

Figure 7:
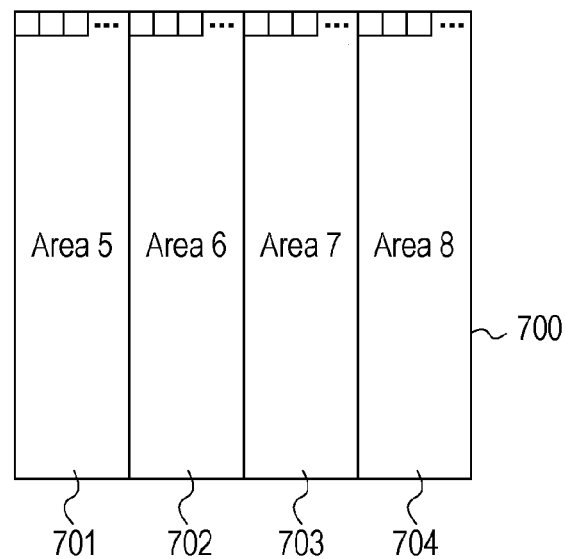
FIG. 7 illustrates an example of how a screen is divided according to the second embodiment.

When an image signal received in the image signal input terminal 101 in units of fields or frames is temporarily stored in the frame memory 601. In step S501, the region segmentation circuit 602 divides a frame image (screen 700) stored in the frame memory 601 four regions (a fifth area 701 (Area 5) to an eighth area 704 (Area 8) in units of slices, as illustrated in FIG. 7. FIG. 7 illustrates an example of how one screen is divided into four portions at predetermined locations in a vertical direction. In the present embodiment, the number of encoding circuits, m, is two, and the number of divisions, i.e., regions formed by dividing performed by the region segmentation circuit 602, n (n is an integer greater than two; n>2), is four.

In step S502, the coding control circuit 106 determines an encoding circuit that is to perform encoding for each of the fifth area 701 to the eighth area 704 out of the plurality of encoding circuits and a temporal encoding order.

In step S503, the first and second encoding circuits 103a and 103b perform encoding for their respective assigned regions. At this time, the coding control circuit 106 controls the first and second encoding circuits 103a and 103b to perform their respective encoding processes in parallel. Then, in step S504, the encoded-data combining circuit 105 combines encoded data elements formed by encoding performed by the first and second encoding circuits 103a and 103b and outputs the combined encoded data to the encoded-data output terminal 107, and the processing is completed.

Figure 8:
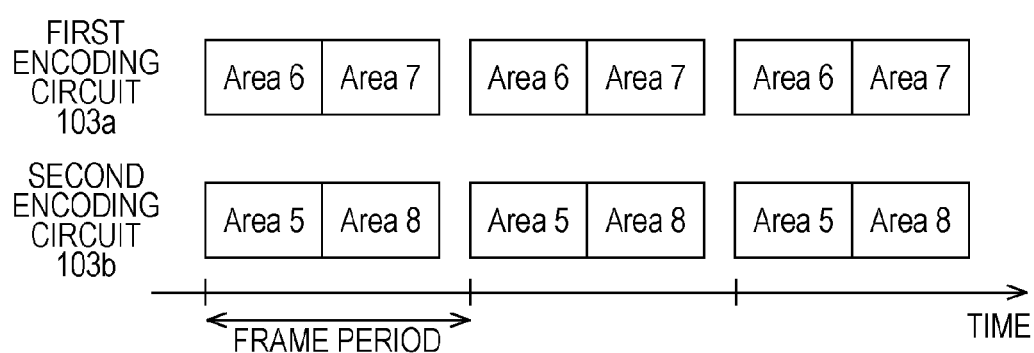
FIG. 8 illustrates an example encoding order according to the second embodiment.

In the present embodiment, the coding control circuit 106 makes an encoding process of slices included in one frame complete for one frame period of an input image signal. That is, the coding control circuit 106 controls the first and second encoding circuits 103a and 103b to encode image data elements for two regions out of the four regions at a time in parallel and controls each of the first and second encoding circuits 103a and 103b to encode the image data elements for the two regions in one frame. Each of the first and second encoding circuits 103a and 103b performs the encoding in a time division manner such that one frame is separated into the first and second halves, as illustrated in FIG. 8. That is, the image data elements for a plurality of regions out of the fifth area 701 to the eighth area 704 are encoded in parallel prior to the encoding for the remaining regions.

In the first half of a frame period, the coding control circuit 106 controls the first encoding circuit 103a to encode the data for the sixth area 702 (Area 6) and the second encoding circuit 103b to encode the data for the fifth area 701 (Area 5) in parallel therewith. In the second half of the frame period, the coding control circuit 106 controls the first encoding circuit 103a to encode the data for the seventh area 703 (Area 7), which is adjacent to the sixth area 702, and the second encoding circuit 103b to encode the data for the eighth area 704 (Area 8) in parallel therewith. When the portions located in the vicinity of the center of the screen are noted, the data for the left region (Area 6) is encoded prior to the encoding of the data for the right region (Area 7).

In encoding control, the coding control circuit 106 sets an initial value of a quantization step size being an encoding parameter for each of the encoding circuits. The encoding for each area is performed in sequence in units of predetermined pixel blocks (e.g., macroblocks). For the encoding order for pixel blocks, the encoding is performed from left to right in the topmost line of an area, then from left to right in the second line, . . . , to the last line. Therefore, in the present embodiment, to determine the initial value of the quantization step size for the leftmost block in the seventh area 703, a result of encoding for the rightmost block in the same line in the encoded sixth area 702 is referred to. Specifically, the coding control circuit 106 holds the quantization step size for the rightmost block in the sixth area 702, and sets the quantization step size for the rightmost block in the sixth area 702 as the initial value of the quantization step size for the leftmost block in the seventh area 703. Such encoding control enables the continuity between the quantization step size in the sixth area 702 located in the vicinity of the center of the screen and that in the seventh area 703, which is adjacent to the sixth area 702, to be ensured. Accordingly, the continuity of image quality in the vicinity of the center of the screen, where differences in image quality being prone to being visually recognized, can be ensured.

The fifth area 701 and the eighth area 704, which are not located in the vicinity of the center of the screen, are remote from each other. Therefore, the optimal quantization step size suited for the characteristics of an image can be set through encoding control for each area on the basis of the details of a block to be encoded.

The structure of each of the first and second encoding circuits 103a and 103b and the detailed encoding process are substantially the same as those in the first embodiment, which is previously described with reference to FIG. 4, so the description thereof is not repeated here.

In the present embodiment, as previously described, the data elements for the two adjacent regions located on the left and the right of the central position of the screen (the sixth area 702 and the seventh area 703) are encoded by the same encoding circuit. That encoding circuit performs encoding for the seventh area 703 (the region on the right of the center) after performing encoding for the sixth area 702 (the region on the left of the center). In addition, when the seventh area 703 is encoded, the frame memory 402 holds at least data of a local decoded image for the rightmost block in the encoded sixth area 702. A local decoded image for the rightmost block in the encoded sixth area 702 is used in intra prediction performed on the leftmost block in the seventh area 703. Information about, for example, the direction of the intra prediction on the rightmost block in the encoded sixth area 702 may be referred to in the intra prediction of the leftmost block in the seventh area 703. Such information about a block for use in the intra prediction or information about the direction of the prediction can also be set in encoding as one of the encoding parameters.

As described above, in the present embodiment, the first and second encoding circuits 103a and 103b perform their encoding processes in parallel, and the encoding for the sixth area 702 located in the vicinity of the center of the screen is performed prior to the encoding for the seventh area 703. The encoding order and encoding parameters are determined such that the continuity of image quality between areas located in the vicinity of the center of the screen is ensured. This enables information about a result of encoding to be shared and the continuity of image quality in the vicinity of the center of the screen, where differences in image quality are prone to being visually recognized, to be ensured, without having to significantly increase the operation speed of each of the encoding circuits. Accordingly, degradation in image quality can be made less noticeable, and the optimal encoding parameters suited for the characteristics of an image can be set.

Other Embodiments

The units included in the moving picture coding apparatus according to the embodiments of the present invention and the steps in the moving picture coding method can be realized by execution of a program stored in a random-access memory (RAM) of a computer or read-only memory (ROM). The program and a computer-readable storage medium that stores the program are included in the scope of the present invention.

According to an aspect of the present invention, an embodiment serving as, for example, a system, an apparatus, a method, a program, or a storage medium is also possible. Specifically, the present invention is applicable to a system including a plurality of devices and also to an apparatus consisting of a single device.

The scope of the present invention includes a case where a software program that realizes the functions of at least one of the foregoing embodiments (in the embodiments, a program corresponding to the flowchart of FIG. 5) is supplied directly or remotely to a system or an apparatus. The scope of the present invention also includes a case where the functions are realized by a computer of the system or the apparatus reading and executing the supplied program code.

Accordingly, code itself (to be) installed in the computer to perform the functional processing of at least one of the embodiments of the present invention by use of the computer is also included in the scope of the present invention. That is, the scope of the present invention includes a computer program itself for performing the functional processing of at least one of the embodiments of the present invention.

In this case, the program may have any form, such as object code, a program executable by an interpreter, or script data suppliable to an operating system, as long as it has functions of the program.

Examples of a storage medium for supplying a program include a floppy disk, a hard disk, an optical disk, a magneto-optical disk (MO), a compact-disk read-only memory (CD-ROM), a compact disk recordable (CD-R), a CD-Rewritable (CD-RW), magnetic tape, a nonvolatile memory card, a ROM, and a digital versatile disk (DVD), such as a DVD-ROM and a DVD-R.

One example of a method for supplying a program is to cause a user to access a website on the Internet using a browser of a client computer and to download a computer program itself or a file that includes a compressed program with an automatic installer from the website into a storage medium (e.g., a hard disk).

Program code constituting a program according to an aspect of the present invention may be divided into a plurality of files and the files may be downloaded from different websites. That is, a world wide web (WWW) server causing a plurality of users to download a program for executing the functional processing of at least one of the embodiments of the present invention by a computer is also included in the scope of the present invention.

The functions of at least one of the embodiments can also be realized by another method including distributing a program corresponding to an aspect of the present invention to users through storage media, such as CD-ROMs, that store its encrypted program, causing a user who satisfies a predetermined condition to download information regarding a decryption key from a website over the Internet, and executing the encrypted program using the key information and installing it in a computer.

The functional processing of at least one of the foregoing embodiment can be realized by a computer reading and executing a program. Performing actual processing in part or in entirety by an operating system (OS) running on a computer in accordance with instructions of the program can realize the functions of at least one of the foregoing embodiments.

The functions of at least one of the foregoing embodiments can also be realized by still another method including writing a program read from a storage medium on a memory included in a function expansion board inserted into a computer or a function expansion unit connected to a computer and then executing actual processing in part or in entirety by use of a central processing unit (CPU) included in the function expansion board or the function expansion unit in accordance with instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-160379 filed Jun. 18, 2007 and No. 2008-120407 filed May 2, 2008, which are hereby incorporated by reference herein in their entirety.

What is claimed is:

1. A moving picture compression coding apparatus comprising:
   a region segmentation circuit that horizontally divides a screen constituting moving picture data into a plurality of regions;
   a plurality of encoding circuits that encode the moving picture data for each of the regions to form encoded data elements, the number of the encoding circuits being smaller than the number of the regions in the screen divided by the region segmentation circuit;
   an encoded-data combining circuit that combines the encoded data elements; and
   a coding control circuit that controls the plurality of encoding circuits to encode the moving picture data for a plurality of regions in the screen in parallel and controls the plurality of encoding circuits so that a first encoding circuit consecutively encodes two regions which are adjacently located one above the other and each of which is neither an uppermost region nor a lowermost region,
   wherein the first encoding circuit does not encode the uppermost region and the lowermost region, and
   wherein, within a frame period, the first encoding circuit encodes the lower region of the two adjacent regions after encoding of the upper region of the two adjacent regions is finished.

2. The moving picture compression coding apparatus according to claim 1,
   wherein each of the plurality of encoding circuits includes a frequency conversion circuit that performs frequency conversion on a block to be encoded in the moving picture data and a quantization circuit that quantizes a conversion coefficient obtained by the frequency conversion using a predetermined quantization step size, and
   the first encoding circuit sets an initial value of the quantization step size for use by the quantization circuit for the lower region in accordance with a result of the encoding of the moving picture data for the upper region.

3. The moving picture compression coding apparatus according to claim 1,
   wherein the region segmentation circuit divides the screen into slices, and
   each of the plurality of encoding circuits compresses the plurality of regions dividing the screen into slices using motion compensation prediction.

4. The moving picture compression coding apparatus according to claim 1, wherein the region segmentation circuit divides the screen into slices, and
   each of the plurality of encoding circuits compresses the plurality of regions dividing the screen into slices using intra prediction.

5. The moving picture compression coding apparatus according to claim 4, wherein the first encoding circuit sets an encoding parameter relating to the intra prediction for a topmost block to be encoded in the lower region in accordance with information of a lowermost block to be encoded in the upper region.

6. A moving picture compression coding apparatus comprising:
   a region segmentation circuit that vertically divides a screen constituting moving picture data into a plurality of regions;
   a plurality of encoding circuits that encode the moving picture data for each of the regions to form encoded data elements, the number of the encoding circuits being smaller than the number of the regions in the screen divided by the region segmentation circuit;
   an encoded-data combining circuit that combines the encoded data elements; and
   a coding control circuit that controls the plurality of encoding circuits to encode the moving picture data for a plurality of regions in the screen in parallel and controls the plurality of encoding circuits so that a first encoding circuit consecutively encodes two regions which are adjacently located side to side and each of which is neither a rightmost region or a leftmost region,
   wherein, within a frame period, the first encoding circuit encodes the right region of the two adjacent regions after encoding of the left region of the two adjacent regions is finished.

7. The moving picture compression coding apparatus according to claim 6,
   wherein each of the plurality of encoding circuits includes a frequency conversion circuit that performs frequency conversion on a block to be encoded in the moving picture data and a quantization circuit that quantizes a conversion coefficient obtained by the frequency conversion using a predetermined quantization step size, and
   the first encoding circuit sets an initial value of the quantization step size for use by the quantization circuit for a leftmost block to be encoded in the right region in accordance with a result of the encoding of the moving picture data for a rightmost block to be encoded in the left region.

8. The moving picture compression coding apparatus according to claim 6, wherein the region segmentation circuit divides the screen into slices, and
   each of the plurality of encoding circuits compresses the plurality of regions dividing the screen into slices using motion compensation prediction.

9. The moving picture compression coding apparatus according to claim 6, wherein the region segmentation circuit divides the screen into slices, and
   each of the plurality of encoding circuits compresses the plurality of regions dividing the screen into slices using intra prediction.

10. The moving picture compression coding apparatus according to claim 9, wherein the first encoding circuit sets an encoding parameter relating to the intra prediction for the leftmost block to be encoded in the right region in accordance with information about a rightmost block to be encoded in the left region.

11. A moving picture compression coding apparatus comprising:
    a region segmentation circuit that divides a screen constituting moving picture data into a plurality of regions;
    a plurality of encoding circuits that encode the moving picture data for the regions; and
    a coding control circuit that controls the plurality of encoding circuits to encode the moving picture data for a plurality of regions in the screen in parallel and controls the plurality of encoding circuits so that a first encoding circuit encodes the moving picture data for two predetermined adjacent regions of the plurality of regions consecutively,
    wherein each of the two predetermined adjacent regions is none of the uppermost region, the lowermost region, the leftmost region and the rightmost region, and
    wherein, within a frame period, the first encoding circuit uses a result of encoding on one of the predetermined adjacent regions whose data is previously encoded in encoding on the other of the predetermined adjacent regions whose data is subsequently encoded.

* * * * *